United States Patent [19]

Watatani et al.

[11] 4,453,186

[45] Jun. 5, 1984

[54] VIDEO AND SOUND SIGNAL RECORDING AND REPRODUCING DEVICE

[75] Inventors: Yoshizumi Watatani; Shigeyuki Ito, both of Yokohama; Katsuo Mohri, Yokosuka, all of Japan

[73] Assignee: Hitachi, Ltd., Tokyo, Japan

[21] Appl. No.: 294,059

[22] Filed: Aug. 18, 1981

[30] Foreign Application Priority Data

Aug. 25, 1980 [JP] Japan ................................. 55-115958

[51] Int. Cl.³ ............................................. H04N 5/782
[52] U.S. Cl. .................................. 358/330; 358/343; 358/341; 360/19.1
[58] Field of Search ...................... 360/19.1, 13, 14.1, 360/22; 369/2, 1; 358/341, 343, 310, 330

[56] References Cited

U.S. PATENT DOCUMENTS

| 3,283,085 | 11/1966 | Lemke | 360/19.1 |
| 3,893,163 | 7/1975 | Wessels | 358/330 |
| 4,141,033 | 2/1979 | Boer | 358/330 |
| 4,303,950 | 12/1981 | Taniguchi | 360/19.1 |
| 4,390,906 | 6/1983 | Furumoto | 360/33.1 |

Primary Examiner—Alan Faber
Attorney, Agent, or Firm—Antonelli, Terry & Wands

[57] ABSTRACT

A sound signal recording and reproducing device for use in a picture signal recording and reproducing apparatus comprises a first sound signal recording and reproducing system recording a sound signal in superposed relation with a picture signal on the same track on a magnetic tape by a rotary head, and a second sound signal recording and reproducing system capable of recording a sound signal independently of the picture signal by a stationary head in a direction parallel with the traveling direction of the magnetic tape.

22 Claims, 2 Drawing Figures

VIDEO AND SOUND SIGNAL RECORDING AND REPRODUCING DEVICE

BACKGROUND OF THE INVENTION

This invention relates to a sound signal recording and reproducing device for use in a picture recording and reproducing apparatus such as a video taper recorder, and more particularly to a sound signal recording and reproducing device which can perform the function of the so-called after-recording such that a second sound signal is recorded on a recording medium while a recorded picture signal is being reproduced, in addition to its primary function of recording a sound signal in concurrent relation with recording of a picture signal on a recording medium.

In a magnetic tape recording and reproducing apparatus of the helical scan type, a sound signal is generally recorded on and reproduced from a sound track formed by a stationary head on an end portion of a magnetic tape. Especially, in the case of a home-use magnetic tape recording and reproducing apparatus, the recordable time with a fixed tape length is desirably as long as possible. To this end, a method is commonly employed in which the traveling speed of the magnetic tape is slowed down, and the width of the picture signal recording track is narrowed. Such a tendency of slowing down the tape traveling speed will continue in the future in view of the strong demand for the miniaturization of the apparatus of this kind.

However, the slowdown of the tape traveling speed leads to such problems among others that the frequency band of the sound signal recorded and reproduced by the stationary head is greatly decreased, and the wow-flutter characteristic is also deteriorated. Further, an attempt to narrow the gap length of the sound head for the purpose of improving the frequency characteristic results in a reduction of the efficiency of recording and reproduction, and this reduced efficiency gives rise to deterioration of the S/N ratio of the reproduced signal.

A method of recording a sound signal on the picture signal recording track in superposed relation with a picture signal can be utilized for the purpose of solving the problem of deterioration of the quality of sound due to the lowered tape traveling speed. According to this method, a rotary head is used for recording the picture signal, and, therefore, the speed of the rotating head is dominant between the relative speeds of the head and the magnetic tape. Thus, when the sound signal is recorded on the magnetic tape in superposed relation with the picture signal, the reproduced frequency band of the sound signal is not dependent upon the traveling speed of the magnetic tape, and the frequency band can be widened. Further, even when the time base of the reproduced sound signal may be subject to a variation, wow and flutter due to the tape traveling speed is almost negligible. In addition to the advantages described above, the desired S/N ratio can be fully ensured.

However, in the above method of recording the sound signal in superposed relation with the picture signal, it is natural that the sound signal must always be recorded in concurrent relation with the picture signal. According to the above method, therefore, it is impossible for the user to additionally record a second sound signal such as an explanation of scenes on the magnetic tape while observing the reproduction of the recorded picture. (This additional recording will be referred to hereinafter as after-recording.)

SUMMARY OF THE INVENTION

It is a primary object of the present invention to provide a magnetic tape recording and reproducing apparatus which permits the after-recording although the apparatus is based on the method of recording a sound signal on a magnetic tape in superposed relation with a picture signal.

Noting the fact that the after-recording is generally utilized, for example, for supplementary explanations of scenes chiefly by the human voice and also utilizing the fact that the human voice explaining the scenes can be fully understood by those who are viewing the scenes in spite of the narrow frequency band of the human voice, the present invention is featured by the fact that a stationary head is associated with a sound signal recording track for recording the human voice or a second sound signal on a magnetic tape for the purpose of after-recording, and a first or primary sound signal is recorded on the magnetic tape in concurrent and superposed relation with a picture signal. In order to improve the S/N ratio, the gap length of the stationary head associated with the after-recording track is widened so that the frequency band is narrower than that required for the recording and reproduction of the primary sound signal.

Therefore, even in a magnetic tape recording and reproducing apparatus based on the method of recording a sound signal on a magnetic tape in concurrent and superposed relation with a picture signal, the so-called after-recording in which, while reproducing the recorded picture signal, a second sound signal is recorded without erasing the first sound signal, can be achieved according to the above features of the present invention.

DESCRIPTION OF THE PREFERRED EMBODIMENT

Figure 1:
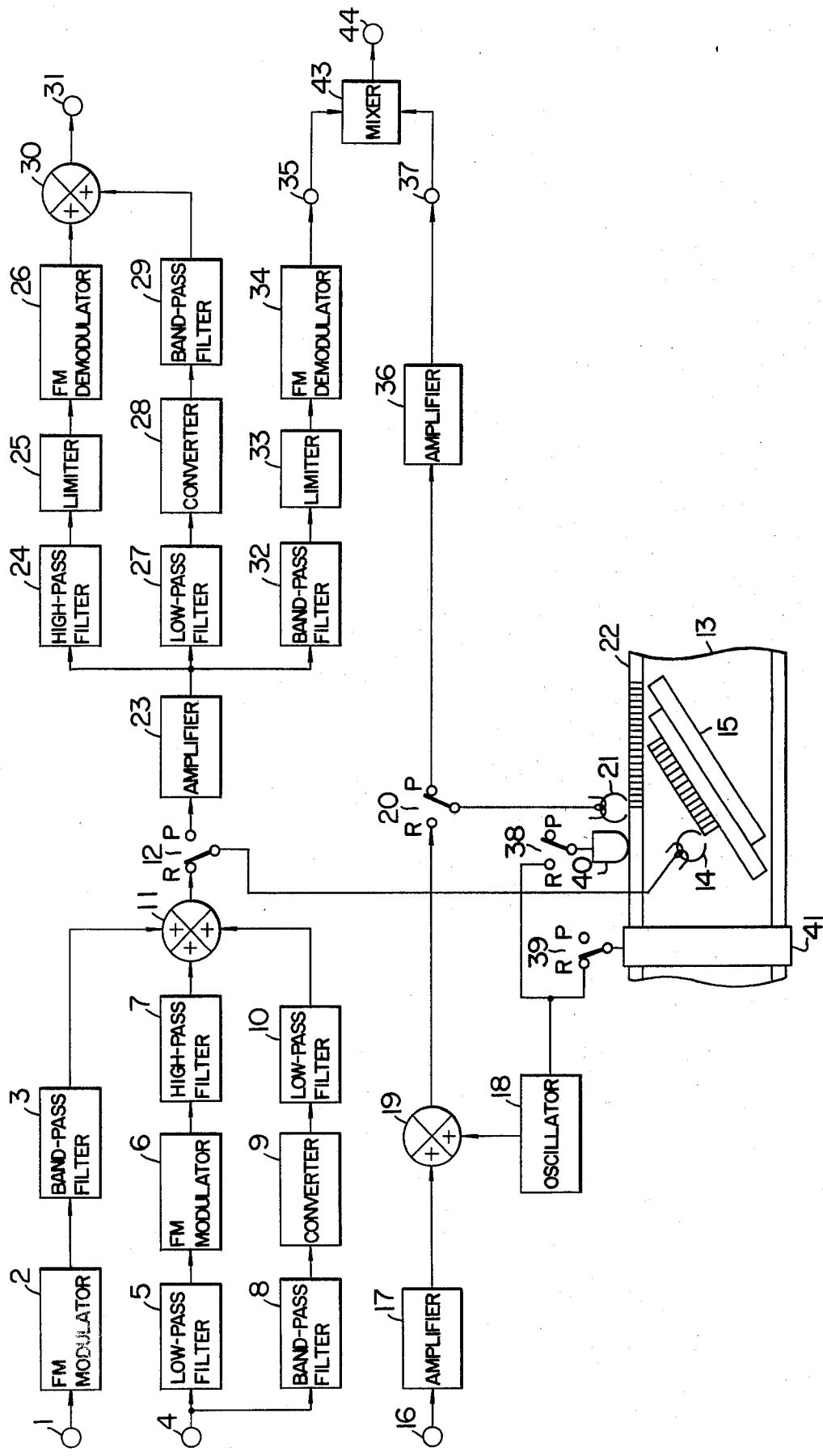
FIG. 1 is a block diagram showing principal parts of an embodiment of the magnetic tape recording and reproducing apparatus according to the present invention.

FIG. 1 is a block diagram showing principal parts of a preferred embodiment of the magnetic tape recording and reproducing apparatus according to the present invention. Referring to FIG. 1, an output from, for example, a microphone (not shown) is applied through, for example, a selector switch (not shown) to sound signal input terminals 1 and 16. More precisely, a first sound signal to be recorded on a picture signal recording track 15 on a magnetic tape 13 in superposed relation with a picture signal is applied to the input terminal 1. On the other hand, a second sound signal or the foregoing human voice explaining scenes to be recorded on an after-recording track 22 on the magnetic tape 13 is applied to the input terminal 16.

The first sound signal applied to the input terminal 1 is applied to an FM modulator 2 in which a carrier having a center frequency of, for example, about 1.3 MHz is frequency-modulated by the input signal. The output signal from the FM modulator 2 is applied to an adder 11 after its unnecessary band components are removed by a band-pass filter 3. A picture signal is applied to another input terminal 4 from, for example, a video camera (not shown). The picture signal applied to the input terminal 4 is then separated into its luminance signal component and its chrominance signal component by a low-pass filter 5 and a band-pass filter 8 respectively. The separated luminance signal component provides a modulation signal applied to an FM modulator 6, and an FM output signal having a carrier frequency of, for example, about 3.0 MHz to 4.0 MHz appears from the FM modulator 6. The FM luminance signal is then applied to the adder 11 after its unnecessary band components are removed by a high-pass filter 7. On the other hand, the chrominance signal component separated by the band-pass filter 8 is applied to a frequency converter 9 to be converted into that of a lower center frequency, and the chrominance signal having a carrier frequency of, for example, about 600 KHz is applied to the adder 11 after its unnecessary band components are removed by a low-pass filter 10.

Figure 2:
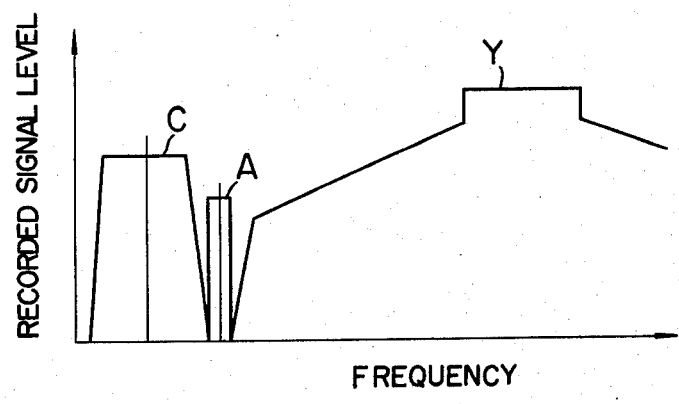
FIG. 2 is a frequency spectrum diagram of recorded signals when a first sound signal is recorded on a magnetic tape in superposed relation with a picture signal, and the after-recording is then done.

The manner of processing of the picture signal is similar to the well-known manner of signal processing for the purpose of recording with a conventional home-use video tape recorder. FIG. 2 is a frequency spectrum diagram of the output signal from the adder 11 to which the three kinds of signals described above are applied. It will be seen in FIG. 2 that the output signal from the adder 11 is a multiple-frequency signal composed of the low-converted chrominance signal shown by C, the FM sound signal shown by A and the FM luminance signal shown by Y in FIG. 2. The frequency spectrum shown in FIG. 2 differs from that of a picture signal recorded with a conventional home-use video tape recorder in that the FM sound signal is additionally included. In the record mode, the multiple-frequency output signal from the adder 11 is applied through a selector switch unit 12 to a rotary head 14 to be recorded on the picture signal recording track 15 on the magnetic tape 13 from which the previous record has been erased by a full erase head 40. In this case, the output signal from a biasing oscillator 18 is applied through a selector switch unit 39 to the full erase head 40.

On the other hand, the selector switch units 12 and 39 are changed over from their R-position to the P-position in the playback mode. Consequently, the full erase head 40 is disabled, and the recorded signal is read out from the track 15 by the rotary head 14. The signal thus read out is applied through the selector switch unit 12 to an amplifier 23 to be amplified up to the desired signal level, and is then applied to a high-pass filter 24, a low-pass filter 27 and a band-pass filter 32. The high-pass filter 24 selects the FM luminance signal component Y shown in FIG. 2, and the low-pass filter 27 selects the chrominance signal component C converted into the low frequency band. The band-pass filter 32 selects the FM sound signal component A lying between the FM luminance signal component Y and the low-converted chrominance signal component C.

The FM luminance signal component separated by the high-pass filter 24 is demodulated by an FM demodulator 26 after its amplitude variations are removed by a limiter 25. The low-converted chrominance signal component separated by the low-pass filter 27 is converted again into the chrominance signal having the normal carrier frequency by a frequency converter 28, and then its unnecessary frequency components are removed by a band-pass filter 29. The luminance signal demodulated by the FM demodulator 26 and the chrominance signal converted again into the normal frequency signal are added together in an adder 30 to appear from an output terminal 31 as the reproduced color video signal. The manner of picture signal processing in the playback mode is similar to the well-known manner of signal processing in a conventional home-use video tape recorder.

On the other hand, the FM sound signal separated by the band-pass filter 32 is demodulated by an FM demodulator 34 after its amplitude variations are removed by a limiter 33, and the demodulated sound signal appears at an output terminal 35. This reproduced sound signal is mixed in a suitable proportion in a mixer circuit 43 with a second sound signal reproduced from the after-recording track 22 in a manner as described later and appearing at an output terminal 37, and the resultant signal appears at an output terminal 44, or these sound signals appear selectively at the output terminal 44. In the latter case, a selector switch may be used for the selective supply of one of the sound signals to the output terminal 44. The same result is obtained when one of the sound signals applied to the mixer circuit 43 is rendered null or inhibited.

Description will now be directed to the operation of the after-recording track 22 which is additionally provided for the recording and reproduction of the second sound signal.

The so-called after-recording, that is, recording of the second sound signal on the after-recording track 22, is carried out while reproducing both of the picture signal and the first sound signal recorded on the track 15 in superposed relation with the picture signal, hence, maintaining the selector switch units 12 and 39 in their P-position. Thus, the after-recording is carried out while the user is observing the reproduced picture displayed on a picture monitor (not shown) to which the picture signal is applied from the picture signal output terminal 31. (Generally, a television receiver receiving a broadcast television signal is used as this monitor.) In the after-recording mode, selector switch units 20 and 38 are maintained in their R-position. Consequently, the second sound signal applied to the input terminal 16 is added in an adder 19 to the output signal from the biasing oscillator 18 after it is amplified up to the desired signal level by an amplifier 17. Thus, the second sound signal is recorded by the so-called AC-biased recording method. The output signal from the biasing oscillator 18 is applied through the selector switch unit 38 to the erase head 40 so as to erase the previous record prior to recording of the second sound signal on the after-recording track 22. The combination of the second sound signal and the biasing signal appearing from the adder 19 is applied through the selector switch unit 20 to a stationary head 21 to be recorded on the track 22. As shown in FIG. 1, the track 15 extends at an oblique angle to the travel direction of the magnetic tape whereas the track 22 is separated from track 15 and extends along the edge of the tape in parallel with the travel direction of the tape.

In order to reproduce the second sound signal recorded on the track 22, the selector switch units 20 and 38 are changed over to their P-position from the R-position. Then, when the magnetic tape 13 is driven, the recorded signal is read out from the track 22 by the stationary head 21. The sound signal thus read out is amplified up to a predetermined level by an amplifier 36 before appearing at the output terminal 37. As described already, the second sound signal appearing at the output terminal 37 is mixed in a suitable proportion in the mixer circuit 43 with the reproduction of the first sound signal recorded on the track 15 in superposed relation with the picture signal, and the resultant signal appears at the output terminal 44, or a selected one of them appears at the output terminal 44.

It is needless to mention that the amplifiers 17 and 36 in the signal recording and reproducing system for the second sound signal recorded on the after-recording track 22 include an equalizer commonly employed in an AC-biased type of recording and reproducing system.

When the traveling speed of the magnetic tape 13 is selected to be lower than about 15 mm/sec for the purpose of recording of a picture signal with a high density, a considerably small value is required for the gap length of the stationary head 21. However, due to the fact that the present invention is based on the method of recording a primary sound signal in superposed relation with a picture signal so that a sufficiently wide frequency band can be obtained at such a tape traveling speed, the gap length of the head 21 associated with the auxiliary track 22 for after-recording is preferably selected to be larger than the customary value by putting importance on the S/N ratio rather than the frequency band.

In the foregoing description, recording of the second sound signal on the after-recording track 22 is carried out while reproducing the picture after recording of the picture signal. However, the second sound signal may be recorded on the track 22 in a relation concurrent with but independent of the first sound signal recorded on the track 15 in superposed relation with the picture signal. The output from a single microphone may be utilized for applying the sound signal to the input terminal 1 or 16. In such a case, the operability of the apparatus can be improved by providing switching means so that the output from the single microphone can always be supplied to the input terminal 1 in the picture signal record mode, while the microphone output can be supplied to the input terminal 16 in the picture signal playback mode.

We claim:

1. A sound signal recording and reproducing device suitable for use in a recording and reproducing apparatus including means for recording a picture signal on a magnetic tape by a rotary head, said device comprising:
    first sound signal recording and reproducing means for multiplexing a first sound signal with a picture signal and recording said first sound signal and said picture signal on the same first recording track in concurrent relation by said rotary head; and
    second sound signal recording and reproducing means including a stationary head for recording a second sound signal on a second recording track which is spaced apart from said first recording track on the magnetic tape and extends in parallel with the traveling direction of the magnetic tape.

2. A sound signal recording and reproducing device as claimed in claim 1, wherein a frequency band reproduced by said second sound signal recording and reproducing means is selected to be narrower than that reproduced by said first sound signal recording and reproducing means.

3. A sound signal recording and reproducing device as claimed in claim 1, further comprising means for one of mixing and alternatively delivering the reproduced output signals from said first and second sound signal recording and reproducing means.

4. A sound signal recording and reproducing device as claimed in claim 1, wherein said first sound signal recording and reproducing means includes means for generating an FM signal of said first sound signal to provide a multiple-frequency signal including said FM sound signal and said picture signal.

5. A sound signal recording and reproducing device as claimed in claim 1, further comprising means for exclusively applying an input sound signal to said first sound signal recording and reproducing means in the picture signal record mode.

6. A sound signal recording and reproducing device as claimed in claim 1, wherein said second sound signal recording and reproducing means operates in the picture signal playback mode.

7. A sound signal recording and reproducing device as claimed in claim 1, wherein said second recording track is disposed on the edge of the magnetic tape, said first recording track extends obliquely to the travel direction of the magnetic tape, and said first sound signal and said picture signal are recorded on said first recording track in superposed relation thereon.

8. A sound signal recording and reproducing device suitable for use in a recording and reproducing apparatus including means for recording a video signal on a magnetic tape by a rotary head, said device comprising:
    first sound signal recording and reproducing means for recording a first frequency modulated sound signal and a video signal in superposed relation on a first recording track by said rotary head; and
    second sound signal recording and reproducing means including a stationary head for recording a second sound signal on a second recording track arranged on the edge of the magnetic tape in parallel with the travelling direction of the magnetic tape.

9. A sound signal recording and reproducing device as claimed in claim 8, wherein a frequency band of the signal reproduced by said second sound signal recording and reproducing means is selected to be narrower than that reproduced by said first sound signal recording and reproducing means.

10. A sound signal recording and reproducing device as claimed in claim 8, further comprising means for one of mixing and alternately delivering the reproduced output signals from said first and second sound signal recording and reproducing means.

11. A sound signal recording and reproducing device as claimed in claim 8, further comprising means for exclusively applying an input sound signal to said first sound signal recording and reproducing means in the video signal record mode.

12. A sound signal recording and reproducing device as claimed in claim 8, wherein said second sound signal recording and reproducing means operates in the video signal playback mode.

13. A sound signal recording and reproducing device as claimed in claim 8, wherein said first recording track extends obliquely to the travelling direction of the magnetic tape, said first sound signal recording and reproducing means records said first frequency modulated sound signal and said video signal in superposed relation with each other at least on a same portion of said first oblique recording track by said rotary head, and wherein after-recording of a sound signal is enabled on said second recording track without deleting said first sound signal recorded on said first oblique recording track.

14. A sound signal recording and reproducing device suitable for use in a recording and reproducing apparatus including means for recording a video signal on a magnetic tape by a video rotary head, said device comprising:
- means for receiving a composite color picture signal including a luminance and a chrominance signal and for frequency modulating a carrier wave with said luminance signal to produce a frequency modulated luminance signal,
- means for converting a frequency band of a carrier chrominance signal obtained from said chrominance signal to a frequency band lower than that of said frequency modulated luminance signal,
- means for frequency modulating a carrier wave of a frequency between carrier waves of said frequency modulated luminance signal and said converted carrier chrominance signal with an input sound signal to produce a frequency modulated sound signal,
- recording and reproducing means for superposingly recording and reproducing said frequency modulated sound signal, said frequency modulated luminance signal and said converted carrier chrominance signal upon oblique tracks on said magnetic tape,
- means for demodulating said frequency modulated sound signal reproduced from said magnetic tape, and
- sound signal recording and reproducing means for recording and reproducing at least one of said input sound signal and another sound signal, said sound signal recording and reproducing means including a stationary magnetic head cooperating with a recording track provided in a portion of said magnetic tape other than said oblique tracks and extending in parallel with the travel direction of said magnetic tape.

15. A sound signal recording and reproducing device as claimed in claim 14, wherein a recording and reproducing frequency band of the sound signal in said sound signal recording and reproducing means is narrower than that of the sound signal in said recording and reproducing means.

16. A sound signal recording and reproducing device as claimed in claim 14, wherein said sound signal recording and reproducing means enters into a recording mode when said recording and reproducing means enters into a recording mode.

17. A sound signal recording and reproducing device as claimed in claim 14, wherein said recording and reproducing means superposingly records and reproduces said frequency modulated sound signal, said frequency modulated luminance signal and said converted carrier chrominance signal entirely upon said oblique tracks on said magnetic tape, and wherein after-recording of a sound signal is enabled on said recording track without deleting said frequency modulated sound signal recorded entirely upon said oblique tracks.

18. A sound signal recording and reproducing device suitable for use in a recording and reproducing apparatus including means for recording a video signal on a magnetic tape by a rotary head, said device comprising:
- means for receiving a composite color picture signal including a luminance and a chrominance signal and for frequency modulating a carrier wave with said luminance signal to produce a frequency modulated luminance signal,
- means for converting a frequency band of a carrier chrominance signal obtained from said carrier chrominance signal to a frequency band lower than that of said frequency modulated luminance signal,
- means for frequency modulating a carrier wave of a frequency between carrier waves of said frequency modulated luminance signal and said converted carrier chrominance signal with an input sound signal to produce a frequency modulated sound signal,
- means for adding said frequency modulated frequency signal, said converted carrier chrominance signal and said frequency modulated sound signal to produce a multi-frequency signal,
- recording and reproducing means for recording and reproducing said multiple-frequency signal upon oblique tracks on said magnetic tape by said rotary head,
- means for demodulating the sound signal extracted from said reproduced multiple-frequency signal, and
- sound signal recording and reproducing means for recording and reproducing at least one of said input sound signal and another sound signal, said sound signal recording and reproducing means including a stationary magnetic head cooperating with a recording track provided in a portion of said magnetic tape other than said oblique tracks and extending in parallel with the travel direction of said magnetic tapes.

19. A sound signal recording and reproducing device as claimed in claim 18, wherein a frequency band of the sound signal in said sound signal recording and reproducing means is narrower than a frequency of the sound signal in said recording and reproducing means.

20. A sound signal recording and reproducing device as claimed in claim 18, wherein said sound signal recording and reproducing means enters into a recording mode when said recording and reproducing means enters into a reproducing mode.

21. A sound signal recording and reproducing device as claimed in claim 18, wherein said sound signal recording and reproducing means enters into a recording mode when said recording and reproducing means enters into a recording mode.

22. A sound signal recording and reproducing device as claimed in claim 18, wherein said recording track other than said oblique tracks is arranged on the edge of said magnetic tape.

* * * * *